United States Patent
Yuan et al.

(10) Patent No.: US 12,473,551 B2
(45) Date of Patent: Nov. 18, 2025

(54) SMALL RNA-BASED DRUG, PREPARATION AND USE THEREOF IN PROPHYLAXIS AND/OR TREATMENT OF CARDIOMYOPATHY

(71) Applicant: SOUTHWEST MEDICAL UNIVERSITY, Sichuan (CN)

(72) Inventors: Qiong Yuan, Sichuan (CN); Sihui Zheng, Sichuan (CN); Chunxiang Zhang, Sichuan (CN); Gan Qiao, Sichuan (CN); Jun Zhang, Sichuan (CN); Siyi Tang, Sichuan (CN)

(73) Assignee: SOUTHWEST MEDICAL UNIVERSITY, Sichuan (CN)

( * ) Notice: Subject to any disclaimer, the term of this patent is extended or adjusted under 35 U.S.C. 154(b) by 0 days.

(21) Appl. No.: 19/010,571

(22) Filed: Jan. 6, 2025

(65) Prior Publication Data

US 2025/0171780 A1 May 29, 2025

Related U.S. Application Data

(63) Continuation of application No. PCT/CN2024/133661, filed on Nov. 22, 2024.

(30) Foreign Application Priority Data

Nov. 23, 2023 (CN) .......................... 202311589842.0

(51) Int. Cl.
*C12N 15/113* (2010.01)
*A61P 9/00* (2006.01)

(52) U.S. Cl.
CPC .............. *C12N 15/113* (2013.01); *A61P 9/00* (2018.01); *C12N 2310/141* (2013.01); *C12N 2320/32* (2013.01)

(58) Field of Classification Search
CPC ............ C12N 15/113; C12N 2310/141; C12N 2320/32; A61P 9/00
See application file for complete search history.

(56) References Cited

U.S. PATENT DOCUMENTS

2023/0348911 A1* 11/2023 Kauppinen .......... C12N 15/113

OTHER PUBLICATIONS

Brieler, J. A. Y., Matthew A. Breeden, and Jane Tucker. "Cardiomyopathy: an overview." American family physician 96.10 (2017): 640-646.*
Potel, Koray N., et al. ("Effects of non-coding RNAs and RNA-binding proteins on mitochondrial dysfunction in diabetic cardiomyopathy." Frontiers in Cardiovascular Medicine 10 (2023).*
Yuan, Qiong, et al. "CircRNA DICAR as a novel endogenous regulator for diabetic cardiomyopathy and diabetic pyroptosis of cardiomyocytes." Signal transduction and targeted therapy 8.1 (2023).*
Sun: "Targeting DICAR regulates diabetic cardiomyopathy through VCP-mediated protein degradation", Wuhan University of Science and Technology, May 2022.
Yuan et al: "CircRNA DICAR as a novel endogenous regulator for diabetic cardiomyopathy and diabetic pyroptosis of cardiomyocytes", Signal Transduction and Targeted Therapy, vol. 8, No. 99, 2023.

* cited by examiner

*Primary Examiner* — Kimberly Chong
(74) *Attorney, Agent, or Firm* — WCF IP

(57) ABSTRACT

This disclosure relates to the field of nucleic acid drug technologies, and in particular to a small RNA-based drug, preparation, and use thereof in prophylaxis and/or treatment of cardiomyopathy. Provided is a novel small RNA with the nucleotide sequence of SEQ ID NO: 10. The small RNA exhibits good structural stability, marked efficacy at 24 h, and high affinity to nascent polypeptide-associated complex α (NACα) protein. With strong activity to suppress the expression of pyroptosis-related proteins, apoptosis-associated speck-like protein containing a caspase recruitment domain (ASC) and gasdermin D (GSDMD), the small RNA can effectively protect cardiomyocytes and enhance the therapeutic effect on diabetic cardiomyopathy (DCM). Furthermore, the small RNA posses advantages of low effective concentration and high biosafety, highlighting its potential for clinical drug development and application as a nucleic acid drug.

12 Claims, 11 Drawing Sheets

Specification includes a Sequence Listing.

SEQUENCE LISTING

```
Sequence total quantity: 16
SEQ ID NO: 1                    moltype = RNA   length = 51
FEATURE                         Location/Qualifiers
source                          1..51
                                mol_type = other RNA
                                note = DICAR-JP4
                                organism = synthetic construct
SEQUENCE: 1
gaacctccgg ggccacaata gcgagatttg taagactcca gggcctccca g        51

SEQ ID NO: 2                    moltype = RNA   length = 51
FEATURE                         Location/Qualifiers
source                          1..51
                                mol_type = other RNA
                                note = DICAR-JP6
                                organism = synthetic construct
SEQUENCE: 2
ccacctccgg ggccacaata gcgagatttg taagactcca gggcctccca g        51

SEQ ID NO: 3                    moltype = RNA   length = 51
FEATURE                         Location/Qualifiers
source                          1..51
                                mol_type = other RNA
                                note = DICAR-JP18
                                organism = synthetic construct
SEQUENCE: 3
caacctcagg ggccacaata gcgagatttg taagactcca gggcctccca g        51

SEQ ID NO: 4                    moltype = RNA   length = 51
FEATURE                         Location/Qualifiers
source                          1..51
                                mol_type = other RNA
                                note = DICAR-JP23
                                organism = synthetic construct
SEQUENCE: 4
caacctccgg cgccacaata gcgagatttg taagactcca gggcctccca g        51

SEQ ID NO: 5                    moltype = RNA   length = 51
FEATURE                         Location/Qualifiers
source                          1..51
                                mol_type = other RNA
                                note = DICAR-JP27
                                organism = synthetic construct
SEQUENCE: 5
caacctccgg ggccacaaaa gcgagatttg taagactcca gggcctccca g        51

SEQ ID NO: 6                    moltype = RNA   length = 51
FEATURE                         Location/Qualifiers
source                          1..51
                                mol_type = other RNA
                                note = DICAR-JP28
                                organism = synthetic construct
SEQUENCE: 6
caacctccgg ggccacaatc gcgagatttg taagactcca gggcctccca g        51

SEQ ID NO: 7                    moltype = RNA   length = 51
FEATURE                         Location/Qualifiers
source                          1..51
                                mol_type = other RNA
                                note = DICAR-JP29
                                organism = synthetic construct
SEQUENCE: 7
caacctccgg ggccacaata acgagatttg taagactcca gggcctccca g        51

SEQ ID NO: 8                    moltype = RNA   length = 51
FEATURE                         Location/Qualifiers
source                          1..51
                                mol_type = other RNA
                                note = DICAR-JP32
                                organism = synthetic construct
SEQUENCE: 8
caacctccgg ggccacaata gcgatatttg taagactcca gggcctccca g        51

SEQ ID NO: 9                    moltype = RNA   length = 51
FEATURE                         Location/Qualifiers
source                          1..51
                                mol_type = other RNA
                                note = DICAR-JP40
```

```
                                 organism = synthetic construct
SEQUENCE: 9
caacctccgg ggccacaata gcgagatttg taagattcca gggcctccca g          51

SEQ ID NO: 10           moltype = RNA   length = 51
FEATURE                 Location/Qualifiers
source                  1..51
                        mol_type = other RNA
                        note = DICAR-JP45
                        organism = synthetic construct
SEQUENCE: 10
caacctccgg ggccacaata gcgagatttg taagactcta gggcctccca g          51

SEQ ID NO: 11           moltype = RNA   length = 21
FEATURE                 Location/Qualifiers
source                  1..21
                        mol_type = other RNA
                        note = nonsense sequence
                        organism = synthetic construct
SEQUENCE: 11
ttgtactaca caaaagtact g                                           21

SEQ ID NO: 12           moltype = RNA   length = 51
FEATURE                 Location/Qualifiers
source                  1..51
                        mol_type = other RNA
                        note = DICAR-JP
                        organism = synthetic construct
SEQUENCE: 12
caacctccgg ggccacaata gcgagatttg taagactcca gggcctccca g          51

SEQ ID NO: 13           moltype = DNA   length = 49
FEATURE                 Location/Qualifiers
source                  1..49
                        mol_type = other DNA
                        note = Primer JP(105989-1)-P1
                        organism = synthetic construct
SEQUENCE: 13
tggaaaggac gaaacaccgc caacctccgg ggccacaata gcgagattt             49

SEQ ID NO: 14           moltype = DNA   length = 49
FEATURE                 Location/Qualifiers
source                  1..49
                        mol_type = other DNA
                        note = Primer JP(105989-1)-P2
                        organism = synthetic construct
SEQUENCE: 14
ctattccgaa gccgctgcag aaaaaaagca ccgactcggt gccactttt             49

SEQ ID NO: 15           moltype = DNA   length = 49
FEATURE                 Location/Qualifiers
source                  1..49
                        mol_type = other DNA
                        note = Primer JP45(105990-1)-P1
                        organism = synthetic construct
SEQUENCE: 15
tggaaaggac gaaacaccgc caacctccgg ggccacaata gcgagattt             49

SEQ ID NO: 16           moltype = DNA   length = 49
FEATURE                 Location/Qualifiers
source                  1..49
                        mol_type = other DNA
                        note = Primer JP45(105990-1)-P2
                        organism = synthetic construct
SEQUENCE: 16
ctattccgaa gccgctgcag aaaaaaagca ccgactcggt gccactttt             49
```

SMALL RNA-BASED DRUG, PREPARATION AND USE THEREOF IN PROPHYLAXIS AND/OR TREATMENT OF CARDIOMYOPATHY

CROSS REFERENCE TO RELATED APPLICATION

This patent application is a U.S. national entry of PCT application No. PCT/CN2024/133661, filed on Nov. 22, 2024, which claims the benefit and priority of Chinese Patent Application No. CN202311589842.0 filed with the China National Intellectual Property Administration on Nov. 23, 2023, and entitled "SMALL RNA-BASED DRUG PREPARATION AND USE THEREOF IN PROPHYLAXIS AND TREATMENT OF CARDIOMYOPATHY", the disclosure of which is incorporated by reference herein in its entirety as part of the present application.

REFERENCE TO SEQUENCE LISTING

A computer readable XML file entitled "GWPCTP20241107587_seqlist", which was created on Dec. 17, 2024, with a file size of about 18,303 bytes, contains the sequence listing for this application, has been filed with this application, and is hereby incorporated by reference in its entirety.

TECHNICAL FIELD

The present disclosure relates to the field of nucleic acid drug technologies, and in particular to a small RNA-based drug, preparation and use thereof in prophylaxis and/or treatment of cardiomyopathy.

BACKGROUND

Diabetic heart disease (DHD) is a high-risk complication in diabetics, characterized by a higher incidence and mortality of heart failure, which are more than three times those of non-diabetic patients with cardiac dysfunction. The treatment outcomes for DHD are also poorer than those for non-diabetic patients with heart disease. A typical manifestation of DHD is diabetic cardiomyopathy (DCM). This condition arises from metabolic disorders and microangiopathy, leading to extensive focal myocardial necrosis and then subclinical cardiac dysfunction. Ultimately, it progresses to heart failure, arrhythmia and cardiogenic shock. Patients with DCM have poor prognosis and there is no effective medication available at present. Therefore, it remains a major focus of the ongoing research to find novel pathogenesis, therapeutic targets for drugs, and treatment methods.

Nucleic acid-based molecular therapy has received extensive attention and research interest as an emerging treatment method in preclinical and clinical research centers. Nucleic acid-based drug therapy is currently a research focus, which is characterized by more clear targets, faster and safer design, and relatively short clinical application timelines. Small nucleic acid drugs have significant advantages in the field of chronic disease treatment. 1) Small nucleic acid drugs directly regulate the expression of upstream genes, making them less likely to develop drug resistance; and 2) the efficacy of small nucleic acid drugs tend to play longer-effect, providing substantial clinical value for the treatment of a plurality of chronic diseases and rare disease. A study explored the relationship between medication compliance and cardiovascular disease by analyzing large-scale health insurance company databases. The data suggest that the proportion of all-cause mortality, myocardial infarction, stroke or coronary revascularization is closely related to medical compliance. Therefore, the advantages of small nucleic acid drugs such as long acting and nonsusceptibility to drug resistance have led the industry to recognize the small nucleic acid drugs as a new direction for the research and development of drugs for cardiovascular disease treatment. However, the restriction of small nucleic acid drug application is mainly due to the in vivo stability and targeted organ delivery. The PCSK9 siRNA play the effect of a 47.5% reduction in low-density lipoprotein cholesterol (LDL-C) at 210 day post-administration, with the effects maintaining for more than 1440 days and an average reduction of LDL-C of 44.2% within 4 years. Inclisiran Sodium Injection (Leqvio®) has been approved by the National Medical Products Administration as a dietary adjuvant therapy for the treatment of adult patients with primary hypercholesterolemia (heterozygous familial and non-familial) or mixed dyslipidemia. Zilebesirna, composed of a small interfering RNA (siRNA) covalently linked to N-acetylgalactosamine (GalNac) ligand, specifically reduces the level of hepatic angiotensinogen mRNA, thereby reducing the level of angiotensinogen and decreasing blood pressure for 24 consecutive weeks. Therefore, using nucleic acid drugs for cardiovascular diseases threrapy is a new research area. This also provides a novel option for the prevention and control strategy of diabetic complications.

In the preliminary study of the present disclosure, it was found that diabetes-induced circulation-associated circular RNA (DICAR)-mm9_circ_008009 and hsa_circ_0131202 had inhibitory effects on DCM. Therefore, DICAR and synthetic DICAR-JP may be candidate drugs for the treatment of DCM. At the molecular level, DICAR-JP binds to valosin-containing protein (VCP) to form a DICAR-JP/VCP complex, which inhibits pyroptosis caused by advanced glycation end products (AGEs) through ubiquitin-proteasome (Ub-Pr) pathway-mediated degradation of Med12. DICAR-JP is the junction part of DICAR that is different from its parental gene, posses a special stem-loop structure, and acts as the core functional fragment of DICAR. However, the existing synthetic DICAR-JP cannot completely inhibit AGEs-induced myocardial injury. Therefore, optimizing the DICAR-JP sequence to enhance its cardioprotective effects is an urgent problem needing to be solved.

SUMMARY

In view of the above problems in the prior art, the present disclosure provides a small RNA-based drug, preparation and use thereof in prophylaxis and/or treatment of cardiomyopathy. The small RNA has marked efficacy at 24 h, and high affinity with nascent polypeptide-associated complex α (NACα) protein. With strong activity to suppress the expression of pyroptosis-related proteins, apoptosis-associated speck-like protein containing a caspase recruitment domain (ASC) and gasdermin D (GSDMD), the small RNA may effectively protect cardiomyocytes and enhance the therapeutic effect on DCM. Furthermore, it possess advantages such as less effective concentration and more biosafety, indicating its potential for clinical drug development and application as a nucleic acid drug.

To achieve the above objective, the present disclosure is achieved by the following technical solutions.

The present disclosure provides a small RNA indicated for treatment of DCM. The small RNA has the nucleotide sequence of SEQ ID NO: 10.

A second aspect of the present disclosure provides a DNA molecule. The DNA molecule encodes the above referred small RNA.

A third aspect of the present disclosure provides a recombinant expression vector. The recombinant expression vector contains the foregoing DNA molecule.

A fourth aspect of the present disclosure provides a host cell. The host cell carries the above referred DNA molecule or recombinant expression vector.

A fifth aspect of the present disclosure provides use of the above referred small RNA, DNA molecule, the recombinant expression vector, or the host cell in preparation of a medicament for treatment of cardiomyopathy.

A sixth aspect of the present disclosure provides a medicament for prophylaxis and/or treatment of cardiomyopathy, where an active pharmaceutical ingredient (API) is one or more selected from the following A to D:
- A. a small RNA, having the nucleotide sequence of SEQ ID NO: 10;
- B. a DNA molecule encoding the small RNA in A;
- C. a recombinant expression vector carrying the DNA molecule in B; and
- D. a host cell carrying the DNA molecule in B or the recombinant expression vector in C.

In addition, the small RNA has a concentration of 1-50 nM; furthermore, the small RNA has a concentration of 30-50 nM.

Embodiments of the present disclosure have the following advantages and positive effects.

1. In the present disclosure, a novel small RNA, DICAR-JP45, with the nucleotide sequence of SEQ ID NO: 10, is obtained by mutating a base at position 39 of DICAR-JP from C to U. The DICAR-JP45 exhibits high spatial structural stability, which is beneficial to improving the half-life of the medicament in vivo, with an efficacy duration of over 24 h.

2. The small RNA DICAR-JP45 provided by the present disclosure has a high affinity for the NACα protein, and demonstrates strong activity to suppress the expression of pyroptosis-related proteins, ASC and GSDMD. This capability effectively protects cardiomyocytes and enhances the therapeutic effect on DCM, providing new insights into the development and application of nucleic acid drugs for treatment of heart damages caused by a plurality of diseases.

3. When the cardiomyocyte injury model is treated established by AGEs, the half-maximal effect concentration (EC50) of the small RNA DICAR-JP45 provided in the present disclosure is as low as 17.93 nM. This represents an improvement over the EC50 of DICAR-JP at 26.19 nM, indicating a less EC50 value and a wide drug safety range. This highlights the potential of DICAR-JP45 for clinical drug development and application as a nucleic acid drug, exhibiting high clinical value and excellent market prospects.

BRIEF DESCRIPTION OF THE DRAWINGS

To explain the technical solutions in embodiments of the present disclosure more clearly, the accompanying drawings required in the examples will be described below in brief.

FIG. 6A is a gel image of the sodium dodecyl sulfate-polyacrylamide gel electrophoresis (SDS-PAGE), and FIG. 6B is a histogram showing the relative expression of ASC;

FIG. 7A is a gel image of the SDS-PAGE, and FIG. 7B is a histogram showing the relative expression of GSDMD;

FIG. 9A is a schematic diagram of the embodiment for db/db mice; FIG. 9B illustrates the detection results of DICAR-JP expression to evaluate AAV9-DICAR-JP infection in heart tissue using quantitative polymerase chain reaction (qPCR); FIG. 9C illustrates the detection results of cardiac function of small animals by B-mode ultrasound; FIG. 9D is a representative picture of mouse heart tissues; FIGS. 9E-9F illustrate the results of Masson staining for the mouse four-chambered hearts; and FIG. 9G shows statistics of the cardiomyocyte area.

DETAILED DESCRIPTION OF THE EMBODIMENTS

Figure 1:
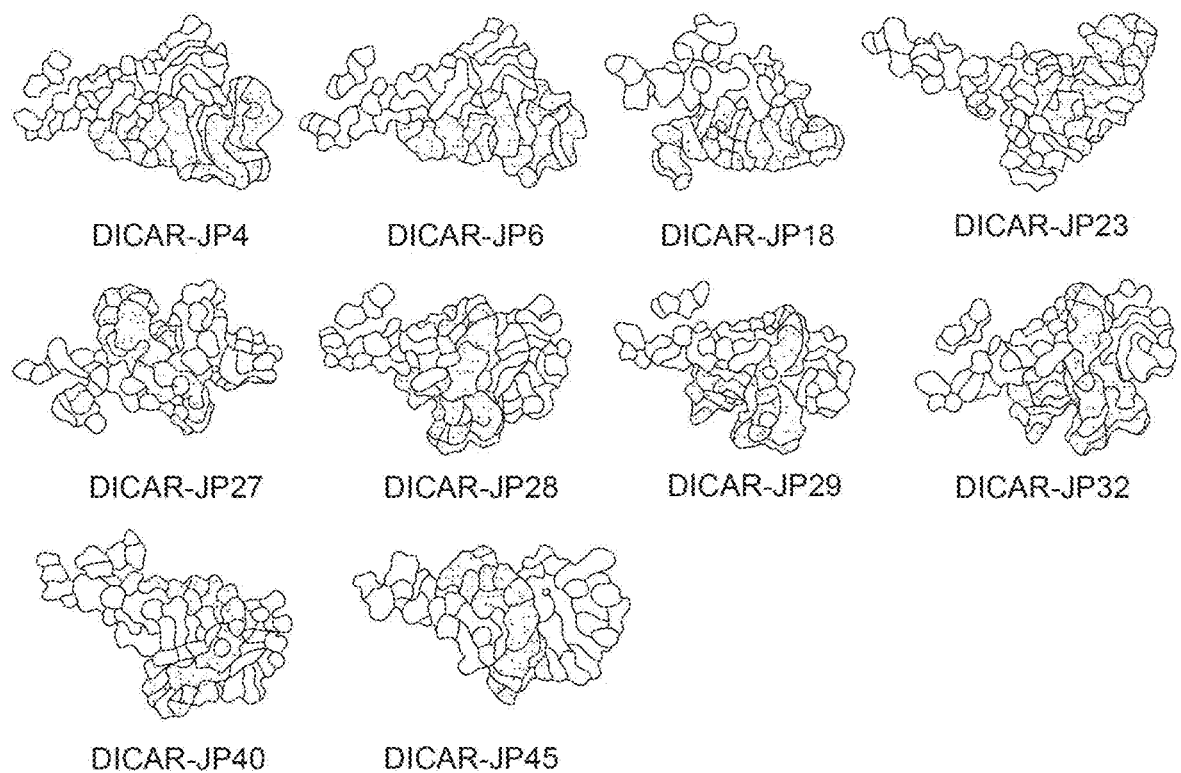
FIG. 1 illustrates a spatial conformation of DICAR-JPN binding to NACα protein according to an example of the present disclosure.

To make the objectives, embodiments, and advantages of the present disclosure clearer, the present disclosure is further described in detail below with reference to the accompanying drawings and examples. The examples described herein are merely used to explain, rather than to limit, the present disclosure.

Based on the information contained in the present disclosure, various changes in the precise description of the present disclosure can be easily made by those skilled in the art without departing from the spirit and scope of the appended claims. It should be understood that the scope of the present disclosure is not limited to the defined processes, properties, or components, as these examples and other descriptions are merely illustrative of specific aspects of the present disclosure. In fact, it will be apparent to those skilled in the art or in the relevant art that various changes that can be made to the embodiments of the present disclosure fall within the scope of the appended claims.

In order to better understand the present disclosure without limiting the scope of the present disclosure, all numbers used in the present disclosure indicating amounts, percentages, and other numerical values are to be understood in all cases as modified by the word "about". The term "about" has its usual meaning and is used to indicate that a value includes inherent variations in the error of the device or method used to determine that value, or includes values close to the value, such as within 10% of the value (or range of values). Therefore, unless otherwise specified, the numerical parameters set forth in the description and appended claims are approximations that may vary depending on the ideal properties sought to be obtained.

The terms "include", "comprise", "contain", "have" and the like have non-restrictive meanings, and other steps and components that do not affect the result can be added. The term "and/or" shall be regarded as a specific disclosure of each of the two specified characteristics or components, with or without the other. For example, "A and/or B" shall be deemed to include the following situations: (i) A, (ii) B, and (iii) A and B.

To make the above objectives, features, and advantages of the present disclosure more obvious and easier to understand, the examples of the present disclosure will be described in detail with reference to the accompanying drawings.

A diabetes-induced circulation-associated circular RNA (DICAR) was identified in a previous study (literature: [Yuan, Q., Sun, Y., Yang, F. et al. CircRNA DICAR as a novel endogenous regulator for diabetic cardiomyopathy and diabetic pyroptosis of cardiomyocytes. Sig Transduct Target Ther 8, 99 (2023). https://doi.org/10.1038/s41392-022-01306-2]) of the present disclosure. At the cellular level, overexpression of DICAR inhibits the effect of AGEs on the activation of GSDMD, NLRP3, caspase-1 and ASC, which in turn inhibits diabetic cardiomyocyte pyroptosis, while knockdown of DICAR lead to enhanced pyroptosis. At the molecular level, DICAR-VCP-Med12 degradation may be a potential molecular mechanism for DICAR-mediated effects. After DICAR binds to valosin-containing protein (VCP), AGEs-induced pyroptosis is inhibited through ubiquitin-proteasome (Ub-Pr) pathway-mediated Med12 degradation. The synthetic DICAR junction part (DICAR-JP) exhibits similar results to the whole DICAR. This suggests that DICAR and synthetic DICAR-JP may be drug candidates for DCM. The nucleotide sequence of the foregoing DICAR-JP is as follows:

```
                              (see SEQ ID NO: 12)
CAACCUCCGGGGCCACAAUAGCGAGAUUUGUAAGACUCCAGGGCCUCCCA
G.
```

In addition, the results of chromatin isolation by RNA purification-mass spectrometry (ChIRP-MS) in the previous study confirmed that DICAR could highly bind to NACα. NACα is a group of nascent polypeptide-associated complexes (NACs), which is composed of α (NACα) and β subunits (NACβ). It is an evolutionary conservative and universally expressed protein, which is necessary for the survival of organisms. NAC binds to ribosome-associated nascent polypeptides and competes with signal recognition particles (SRPs) to prevent cytoplasmic and mitochondrial proteins from mistargeting the endoplasmic reticulum, thereby preventing endoplasmic reticulum stress. In some species and cell lines, NAC deficiency activates the endoplasmic reticulum stress response and ultimately leads to cell death through JNK and caspase activation. Therefore, NAC plays a crucial role in protein quality control and maintaining cellular homeostasis.

The activity of the existing DICAR-JP sequence and structure in inhibiting AGEs-induced myocardial injury and protecting the heart needs to be improved. Therefore, optimizing the nucleic acid sequence of DICAR-JP to increase its binding affinity to NACα is significant for improving its cardioprotective effects. This could have more effective cardioprotection and DCM therapy, highlighting its significance and broad application prospects.

Based on this, the example of the present disclosure provides a small RNA having the nucleotide sequence of:
CAACCUCCGGGGCCACAAUAGCGAGAUUU-GUAAGACUCUAGGGCCUCCCAG (SEQ ID NO: 10), where the bold and underlined site is a mutation site as opposed to DICAR-JP.

In the present disclosure, in order to optimize the fragment of the DICAR-JP sequence for improved cardioprotective effect, the single nucleotide mutation was conducted on DICAR-JP to obtain 64 mutant sequences, DICAR-JPN (N is any integer from 1 to 64). After that, the binding activity of the mutant sequences to the target protein NACα was evaluated by using the molecular docking software HDOCK™. The mutant sequences with unreasonable spatial conformation were eliminated according to the docking score and the structural stability of the nucleic acid sequence, and a total of 10 candidate sequences including DICAR-JP4, DICAR-JP6, DICAR-JP18, DICAR-JP23, DICAR-JP27, DICAR-JP28, DICAR-JP29, DICAR-JP32, DICAR-JP40 and DICAR-JP45 were identified through screening. The molecular conformations of the foregoing 10 candidate sequences are shown in FIG. 1. The protective activity of candidate sequences against AGEs-treated cardiomyocytes was further evaluated by CCK8 assay. It was found that DICAR-JP45 exhibited higher cardiomyocyte viability. At the same time, pharmacodynamic experiments showed that the half-maximal effect concentration ($EC_{50}$) of DICAR-JP45 was 17.93 nM, which was lower than that of DICAR-JP (26.19 nM). This revealed that DICAR-JP45 had better resistance to AGEs than DICAR-JP, and it demonstrated a lower effective concentration, showing excellent cardiomyocyte protection. Moreover, DICAR-JP45 suppressed the expression of ASC and GSDMD more significantly compared with DICAR-JP. This indicated that DICAR-JP45 could inhibit AGEs-induced pyroptosis in cardiomyocytes, making it potentially more effective in treating diabetic cardiomyopathy and protecting against myocardial damage caused by DCM than the original sequence DICAR-JP. In addition, the results of SPR molecular interaction showed that the affinity of DICAR-JP45 to NACα protein was $6.09 \times 10^{-9}$ (M), which was higher than that of DICAR-JP, showing better cardiomyocyte protection potential.

Figure 2:
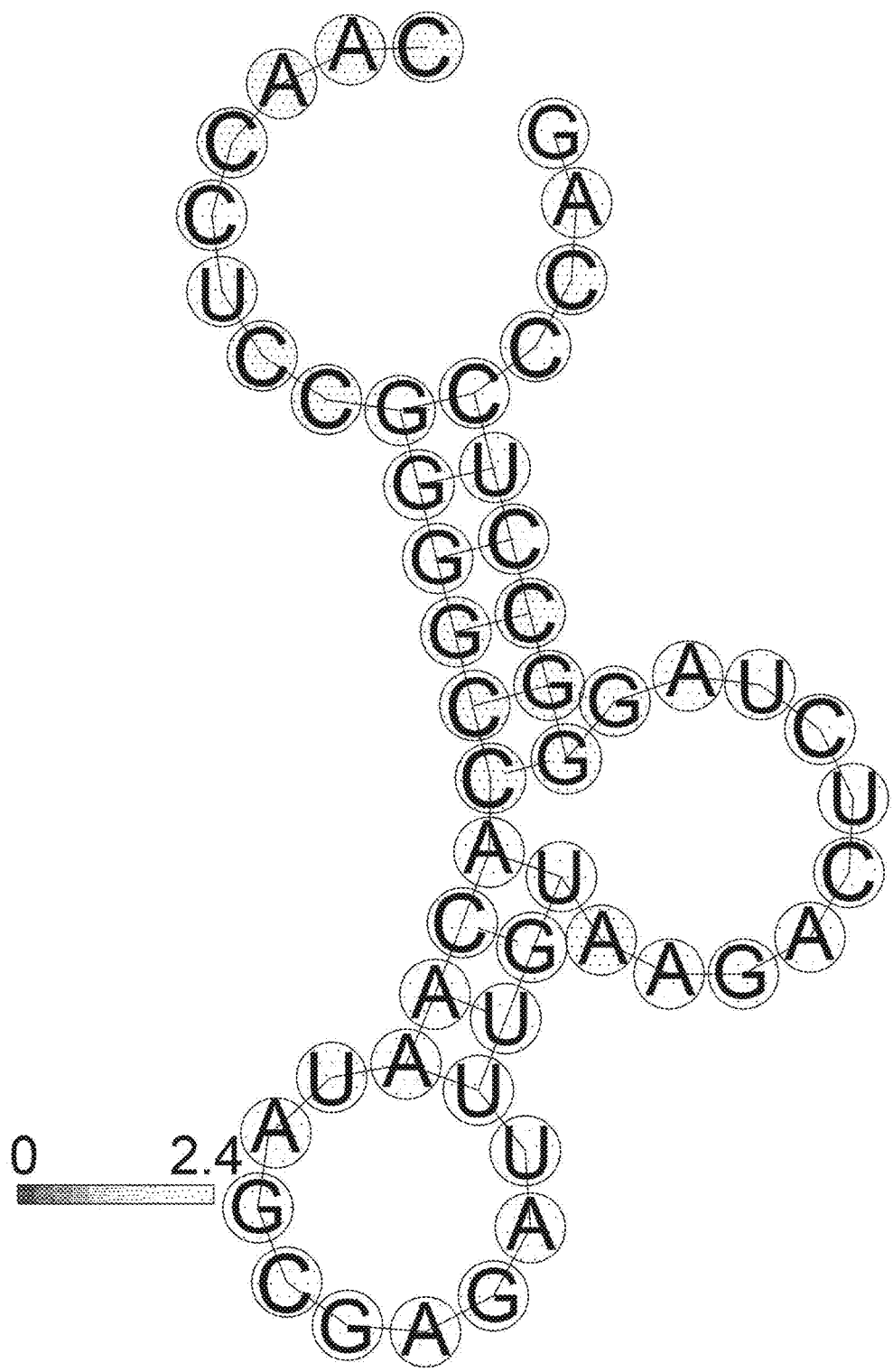
FIG. 2 illustrates a secondary structure of DICAR-JP45 (SEQ ID NO: 10) according to an example of the present disclosure.

The above results show that in the present disclosure, mutating base 51 from base C to base U substantially improves the spatial structural stability of small RNA DICAR-JP45, which is beneficial to improving the half-life in vivo, ensuring an efficacy duration of over 24 h. FIG. 2 illustrates the secondary structure of DICAR-JP45. Moreover, the optimized structure improves the binding affinity to NACα protein and the activity to suppress the expression of pyroptosis-related proteins ASC and GSDMD. It may protect cardiomyocytes more effectively and can combat AGEs-induced damage, providing a novel candidate nucleic acid sequence for the development and application of nucleic acid drugs for treating heart injury caused by various diseases. Furthermore, DICAR-JP45, the sequence of the small RNA provided by the present disclosure, is characterized by lower effective concentration and broader drug safety range. This highlights the potential of DICAR-JP45 for clinical drug development and application as a nucleic acid drug, showing excellent market development prospects and clinical value.

The small RNA according to the foregoing technical solution of the present disclosure, the DNA molecule, the recombinant expression vector or the host cell capable of expressing the small RNA of the foregoing technical solution may be used as an API of a medicament, which can inhibit cardiomyocyte pyroptosis and play a role in prophylaxis, remission or treatment of cardiomyopathy.

Optionally, when the medicament is formulated into a liquid formulation or an intravenous injection, the concentration of the small RNA is 1-50 nM, preferably 30-50 nM.

docking software HDOCK™. They are comprehensive scores, with more negative scores indicating better binding ability. They serve as a preliminary indicator of binding capability. The mutant sequences with unreasonable spatial conformation were eliminated according to the docking score and the structural stability of the nucleic acid sequence, and a total of 10 candidate sequences including DICAR-JP4, DICAR-JP6, DICAR-JP18, DICAR-JP23, DICAR-JP27, DICAR-JP28, DICAR-JP29, DICAR-JP32, DICAR-JP40 and DICAR-JP45 were identified through screening. Specific nucleotide sequences and docking scores are shown in Table 1. The spatial conformations of the 10 candidate sequences binding with the NACα protein are shown in FIG. 1, where DICAR-JP1 to DICAR-JP10 represent the foregoing 10 candidate sequences, respectively. FIG. 2 illustrates the secondary structure of DICAR-JP45.

TABLE 1

The nucleotide sequences of the candidate sequences in the example and the docking scores of their binding to NACα

| Sequence name | Nucleotide sequence | Docking score |
| --- | --- | --- |
| DICAR-JP4 | GAACCUCCGGGGCCACAAUAGCGAGAUUUGUAAGACUCC AGGGCCUCCCAG (SEQ ID NO: 1) | −262.25 |
| DICAR-JP6 | CCACCUCCGGGGCCACAAUAGCGAGAUUUGUAAGACUCC AGGGCCUCCCAG (SEQ ID NO: 2) | −270.11 |
| DICAR-JP18 | CAACCUCAGGGGCCACAAUAGCGAGAUUUGUAAGACUCC AGGGCCUCCCAG (SEQ ID NO: 3) | −269.74 |
| DICAR-JP23 | CAACCUCCGGCGCCACAAUAGCGAGAUUUGUAAGACUCC AGGGCCUCCCAG (SEQ ID NO: 4) | −267.21 |
| DICAR-JP27 | CAACCUCCGGGGCCACAAAAGCGAGAUUUGUAAGACUCC AGGGCCUCCCAG (SEQ ID NO: 5) | −262.37 |
| DICAR-JP28 | CAACCUCCGGGGCCACAAUCGCGAGAUUUGUAAGACUCC AGGGCCUCCCAG (SEQ ID NO: 6) | −276.09 |
| DICAR-JP29 | CAACCUCCGGGGCCACAAUAACGAGAUUUGUAAGACUCC AGGGCCUCCCAG (SEQ ID NO: 7) | −275.73 |
| DICAR-JP32 | CAACCUCCGGGGCCACAAUAGCGAUAUUUGUAAGACUCC AGGGCCUCCCAG (SEQ ID NO: 8) | −269.35 |
| DICAR-JP40 | CAACCUCCGGGGCCACAAUAGCGAGAUUUGUAAGAUUCC AGGGCCUCCCAG (SEQ ID NO: 9) | −282.15 |
| DICAR-JP45 | CAACCUCCGGGGCCACAAUAGCGAGAUUUGUAAGACUCU AGGGCCUCCCAG (SEQ ID NO.10) | −273.01 |

The present disclosure will be further described below with reference to specific examples. In the following examples, the experimental methods in which specific conditions are not specified are generally carried out according to conventional conditions or according to the conditions recommended by the manufacturer. The materials, reagents, and the like used in the following examples are all commercially available, unless otherwise specified.

Example 1 Optimization of Nucleic Acid Sequences

A single nucleotide mutation was conducted on small RNA DICAR-JP to obtain 64 mutant sequences, DICAR-JPN (N is any integer from 1 to 64). For the target protein NACα, the docking scores of the mutant sequence and the target protein NACα were calculated by using the molecular Example 2 Nucleic Acid Sequence Screening In this example, CCK8 assay was used to evaluate the protective activity of the candidate sequences against cardiomyocytes treated with advanced glycation end products (AGEs, purchased from Bioss®, Cat #bs-1158P), so as to select a small RNA with a better protective effect on cardiomyocytes. The method included the following steps:

Cell culture: AC16 human cardiomyocytes (purchased from Guangzhou Jennio Biotech Co., Ltd., derived from ATCC) were cultured in DMEM (High Glucose) Complete Medium (supplemented with 10% fetal bovine serum (FBS) and 1% trispecific antibody) in a 5% $CO_2$, 37° C. incubator.

Grouping: Control, AGEs (200 μg/mL, 24 h/48 h), negative control (NC, 20 nM, 24 h), DICAR-JP4 (20 nM, 24 h), DICAR-JP6 (20 nM, 24 h), DICAR-JP18 (20 nM, 24 h), DICAR-JP23 (20 nM, 24 h), DICAR-JP27 (20 nM, 24 h), DICAR-JP28 (20 nM, 24 h), DICAR-JP29 (20 nM, 24 h), DICAR-JP32 (20 nM, 24 h), DICAR-JP40 (20 nM, 24 h), DICAR-JP45 (20 nM, 24 h), and DICAR-JP (20 nM, 24 h).

Nucleic acid transfection method: Two microliters (μL) each of Lipofectamine® RNAi MAX (Thermo Fisher Scientific RNi MAX, Cat #13778-500) and DICAR-JPN were diluted with Opti-MEM® Medium (50 μL), respectively, and then the two reagents were mixed well and incubated at room temperature for 5 min. The Lipofectamine® RNAi MAX-DICAR-JPN complex was added to the AC16 cell supernatant (50 μL/well, 24 h) on a 24-well plate. Afterward, the complete medium was replaced with serum-free DMEM, and the cell cycle was synchronized for 2 h. AC16 cells were treated with 200 μg/mL AGEs for 24 and 48 h, respectively, and their viability was evaluated by CCK8 assay.

Evaluation of cell viability by CCK8 assay: The cells were washed twice with phosphate-buffered saline (PBS) in the dark, and serum-free DMEM supplemented with CCK8 (CCK8: DMEM=1:9) was added; the well plate was placed back into the cell culture incubator for further incubation for 1 h, and the absorbance was measured at 450 nm using a microplate reader. The cell viability (%) was calculated according to the following formula:

Cell viability=$[(A_{450nm}\text{Experiment}-A_{450nm}\text{Blank})]/[(A_{450nm}\text{Control}-A_{450nm}\text{Blank})] \times 100\%$, where the blank refers to the serum-free DMEM.

Figure 3:
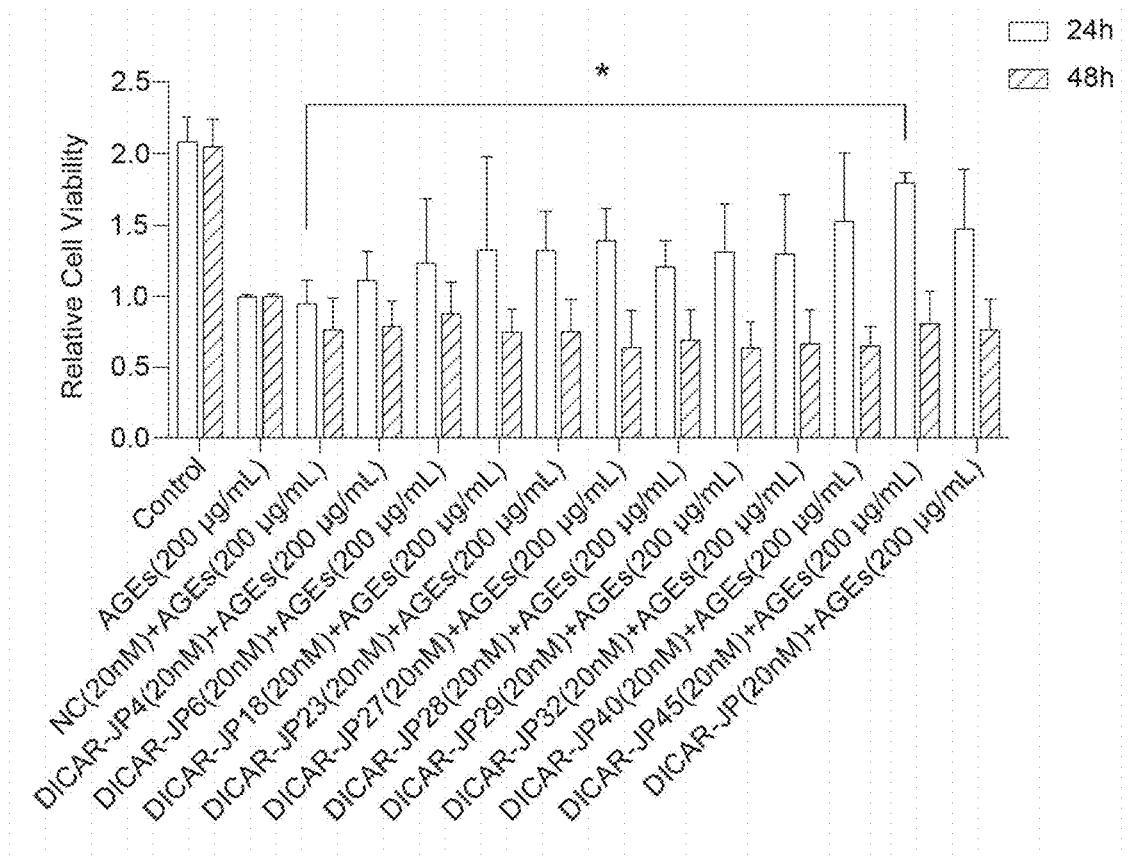
FIG. 3 illustrates effects of treatment with DICAR-JP45 and AGEs for 24 and 48 h on the relative activity of AC16 cardiomyocytes according to an example of the present disclosure.

FIG. 3 illustrates the relative survival of cardiomyocytes in different treatment groups. It was found that DICAR-JP40 and DICAR-JP45 had a significant protective effect on cardiomyocytes treated with AGEs (200 μg/mL) for 24 h compared with DICAR-JP; the relative cell viability of these two groups was significantly higher than that of the model group; the cell viability of DICAR-JP45 was even close to that of the untreated group, and the protective effect of both disappeared at around 48 h.

Example 3 Pharmacodynamics of DICAR-JP45

Calculation of $EC_{50}$ of DICAR-JP45: In order to compare the drug safety of DICAR-JP45 and DICAR-JP, the experiments were divided into normal control, AGEs (200 μg/mL), NC (50 nM, 24 h)+AGEs (200 μg/mL, 24 h), metformin (20 μM, 24 h)+AGEs (200 μg/mL, 24 h), and DICAR-JP45/DICAR-JP (1, 10, 20, 30, 40, and 50 nM, 24 h)+AGEs (200 μg/mL, 24 h) groups. The cell viability was detected by CCK8 assay after 24 h of cell treatment. The absorbance was measured at 450 nm using a microplate reader to calculate the half-maximal effect concentration ($EC_{50}$), respectively. $EC_{50}$ was calculated according to the following formula:

$$EC_{50} = \{[(A_{450nm}\text{Nucleic acid} - A_{450nm}\text{Blank})] -$$
$$[(A_{450nm}\text{Model} - A_{450nm}\text{Blank})]\}/\{[(A_{450nm}\text{Negative} - A_{450nm}\text{Blank})] -$$
$$[(A_{450nm}\text{Model} - A_{450nm}\text{Blank})]\} \times 100\%,$$

where the blank refers to the serum-free DMEM.

Figure 4:
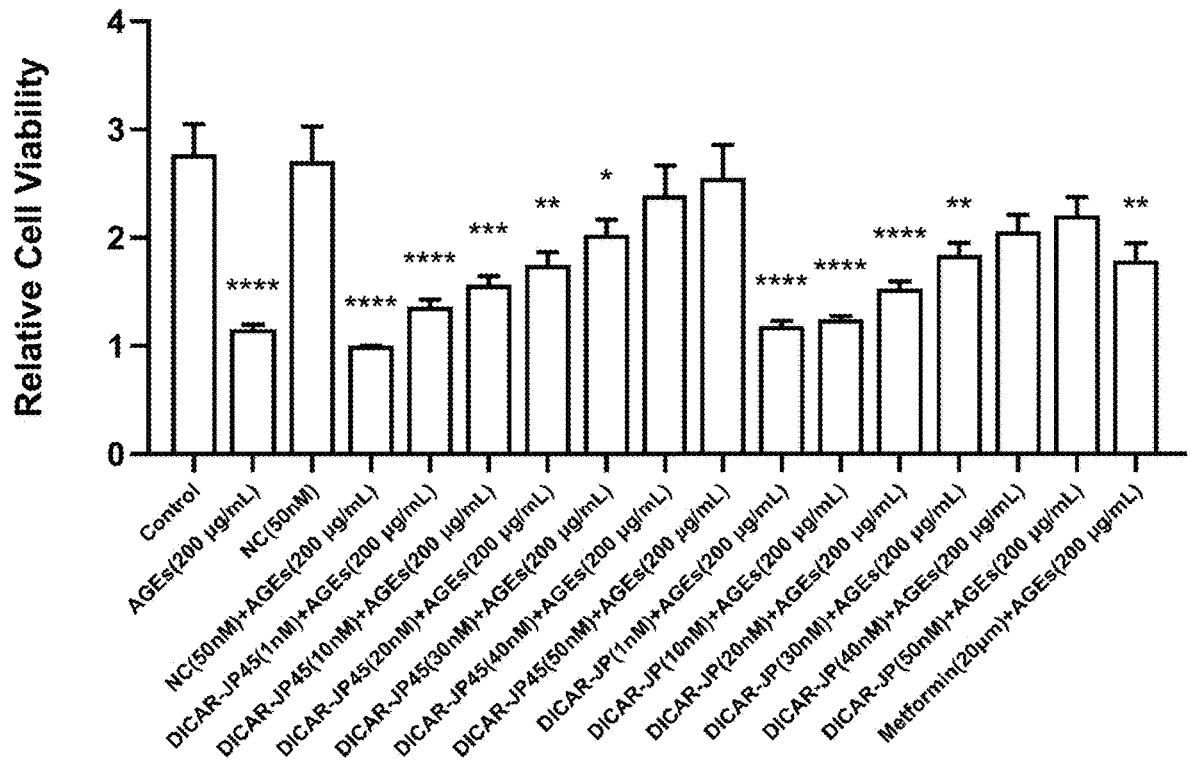
FIG. 4 illustrates effects of treatment with gradient concentrations of DICAR-JP45 and DICAR-JP in combination with AGEs for 24 h on the relative activity of AC16 cardiomyocytes according to an example of the present disclosure.
Figure 5:
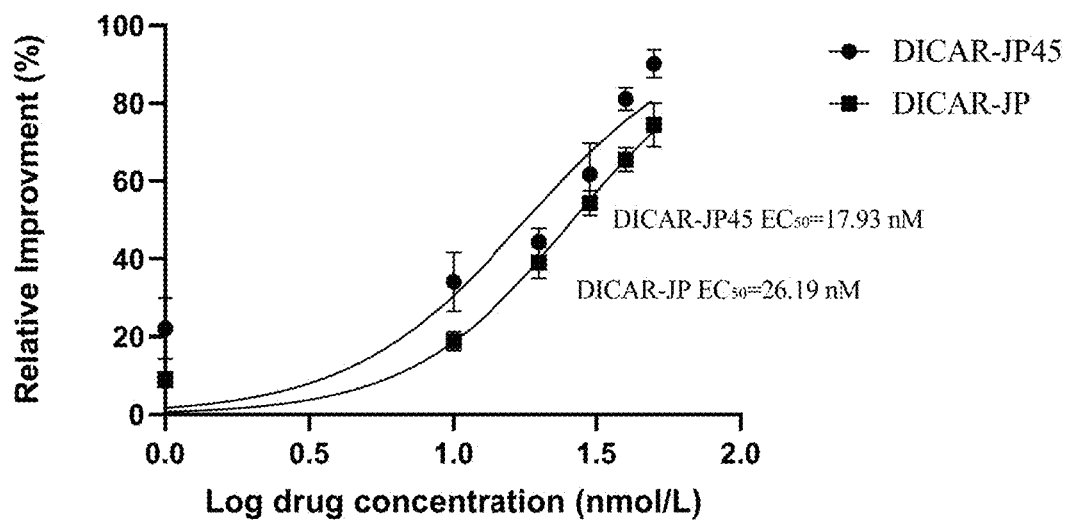
FIG. 5 illustrates a trend of EC50 of DICAR-JP45 and DICAR-JP against AGEs according to an example of the present disclosure.

FIG. 4 illustrates the relative survival of cardiomyocytes with increasing concentration gradients of DICAR-JP45 and DICAR-JP45. It was found that the protective effects of DICAR-JP and DICAR-JP45 increase within the concentration gradient range. According to the fitting curve (see FIG. 5), the $EC_{50}$ of DICAR-JP45 was calculated to be 17.93 nM, and that of DICAR-JP was 26.19 nM. This indicates that DICAR-JP45 has a better resistance to AGEs induced cardiomyocyte injury than DICAR-JP, showing a lower EC50 and higher biosafety. Therefore, DICAR-JP45 is more promising for drug development and application.

Example 4 Effect of DICAR-JP45 Treatment on Expression of Pyroptosis-Related Proteins in DCM Model The DICAR-JP45 (40 nM) and DICAR-JP sequences were transfected into AC16 cell model for 24 h, respectively. The serum-free medium was replaced for starvation for 2 h, followed by treatment with AGEs (200 μg/mL) for 24 h, respectively. After the cells were treated, the expressions of pyroptosis-related proteins, GSDMD and apoptosis associated speck-like protein containing a CARD (ASC), were detected by Western blot (WB). The internal reference protein was β-actin. The WB was conducted according to the following steps.

Figure 6A:
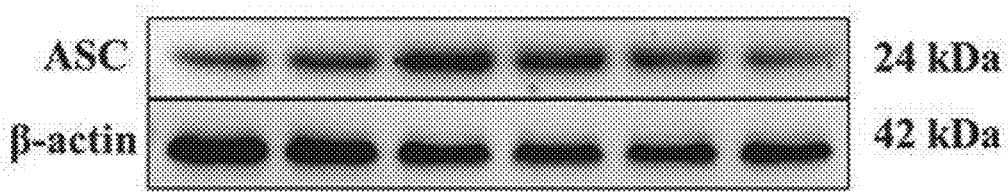
FIGS. 6A-6B illustrate effects of DICAR-JP45 and DICAR-JP transfection into AC16 in combination with AGEs for 24 h on the expression of ASC in DCM according to an example of the present disclosure, where
Figure 6B:
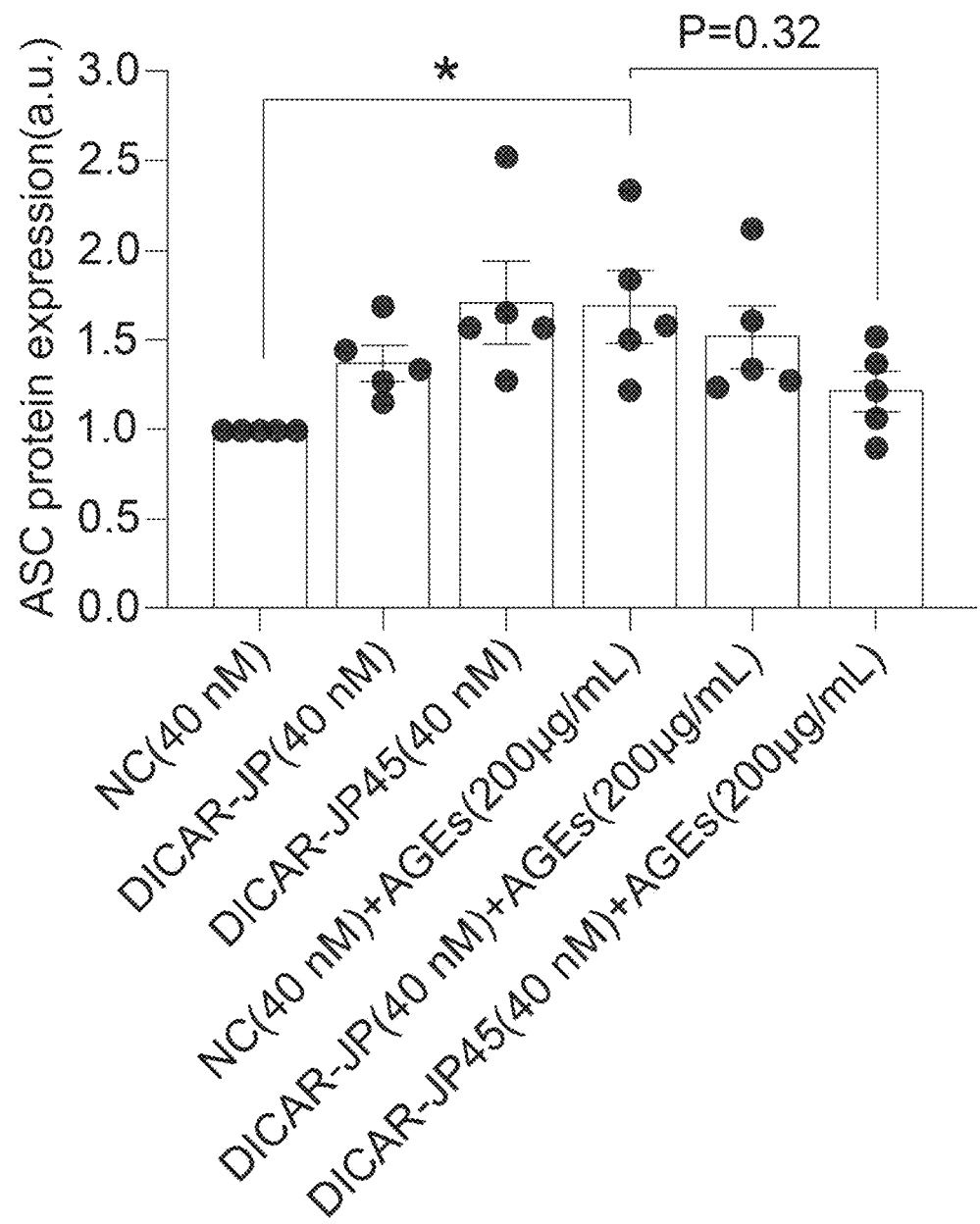
Figure 7A:
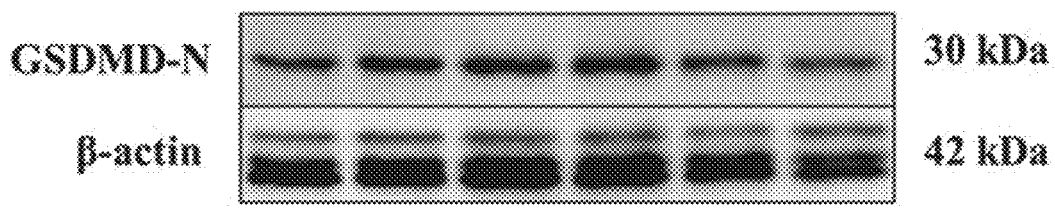
FIGS. 7A-7B illustrate effects of DICAR-JP45 and DICAR-JP transfection into AC16 in combination with AGEs for 24 h on the expression of GSDMD in DCM according to an example of the present disclosure, where
Figure 7B:
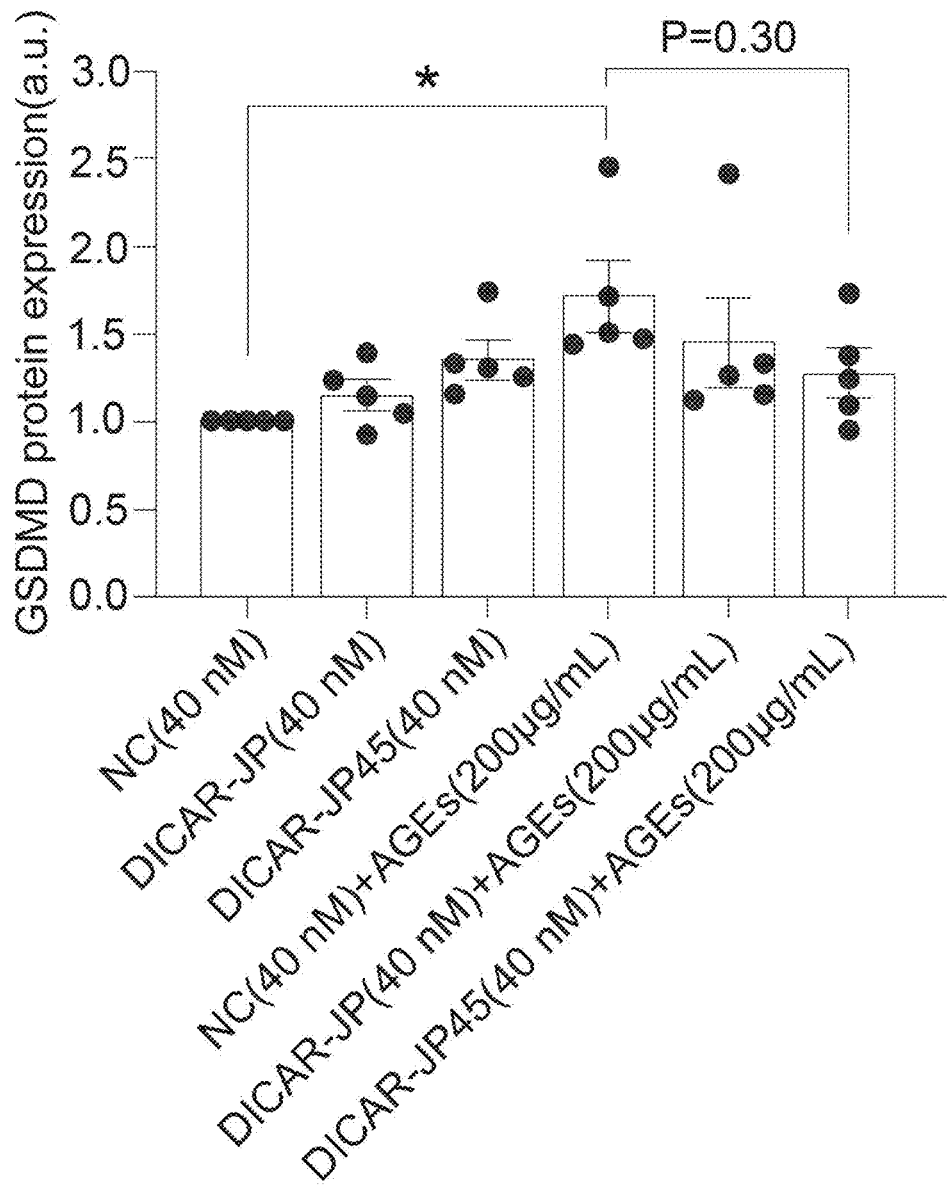

The cells were rinsed twice with PBS, protein lysate (100 μL/well) was added, and the cells were lysed on ice for 30 min. The lysate was collected and centrifuged at 12000 rpm for 30 min at 4° C. After centrifugation, the supernatant protein was collected. The protein sample was mixed with the protein loading buffer at a 4:1 ratio and heated in a metal bath at 95° C. for 10 min, and the sample was stored at 4° C. Proteins were separated by 12.5% sodium dodecyl sulfate-polyacrylamide gel electrophoresis (SDS-PAGE), followed by electrophoresis at a constant voltage of 80 V for 30 min and then electrophoresis at a constant voltage of 110 V. After the protein electrophoresis was completed, the membrane was transferred at a constant current of 300 mA for 90 min. The membrane was taken out and placed in an antibody incubation box, washed with Tris Buffered Saline with Tween-20 (TBST) 3 times for 5 min each, and blocked with Rapid Blocking Buffer for 30 min. Primary antibodies (Rabbit polyclonal antibody to GSDMD was purchased from Affinity, Inc., Cat #AF4012; ASCASC/TMS1/PY-CARD (B-3) antibody was purchased from Santa Cruz Biotechnology, Cat #sc-514414; β-actin monoclonal antibody was purchased from Proteinuech Group, Cat #66009-1-Ig) were incubated overnight at 4° C.; they were washed with TBST 3 times for 5 min each; bispecific antibodies (HRP-conjugated affinipure goat anti-mouse IgG (H+L, Proteintech®, SA00001-1); HRP-conjugated affinipure goat Anti-Rabbit IgG (H+L) (Proteintech®, Cat #SA00001-2)) were incubated at room temperature for 50 min; they were washed with TBST 3 times for 10 min each. Signals were detected by using enhanced chemiluminescent reagent, and the Western blot bands were quantitatively analyzed by Image J software. The expression of GSDMD and ASC is shown in FIGS. 6A-6B and 7A-7B, respectively, where panel FIG. 6A and FIG. 7A are gel images of SDS-PAGE, and FIG. 6B and FIG. 7B show histograms of the relative expression of the protein. In this example, a negative control group (40 nM NC, 24 h)+AGEs (200 μg/mL, 24 h) group and DICAR-JP45/DICAR-JP (40 nM, 24 h)+AGEs (200 μg/mL, 24 h) groups, as well as NC alone, DICAR-JP45 or DICAR-JP treatment group were set. The groups in top and bottom panels correspond to each other.

Pyroptosis mainly mediates the activation of a plurality of caspases including caspase-1 through inflammasomes. After activation of inflammasomes, inflammasome adaptor protein ASC and protease caspase-1 are recruited to form a macromolecular complex. Activation of caspase-1 will directly lyse gasdermin D (GSDMD), resulting in cell membrane perforation and then cell death. From FIGS. 6A-6B and 7A-7B, it can be seen that DICAR-JP45 can suppress the expression of pyroptosis-related proteins ASC and GSDMD more significantly compared with DICAR-JP after AC16 human cardiomyocytes were treated with DICAR-JP45 or DICAR-JP; it indicates that DICAR-JP45 has the ability to protect myocardial injury caused by DCM by inhibiting cardiomyocyte pyroptosis, with better efficacy than DICAR-JP.

Example 5 Affinity of DICAR-JP45 to NACα Protein in Cardiomyocytes

The affinity of DICAR-JP45 and DICAR-JP for binding to NACα protein was compared using localized surface plasmon resonance (SPR) technology (Wuhan Yangene Biological Technology Co., Ltd.). NC, DICAR-JP45, and DICAR-JP were set at 7.8, 15.625, 31.25, 62.5, and 125 nM, respectively, and the response values (ordinate) for binding NACα protein to RNA sequences at target concentrations were observed in diethylpyrocarbonate (DEPC)-treated water at 25° C.

Figure 8:
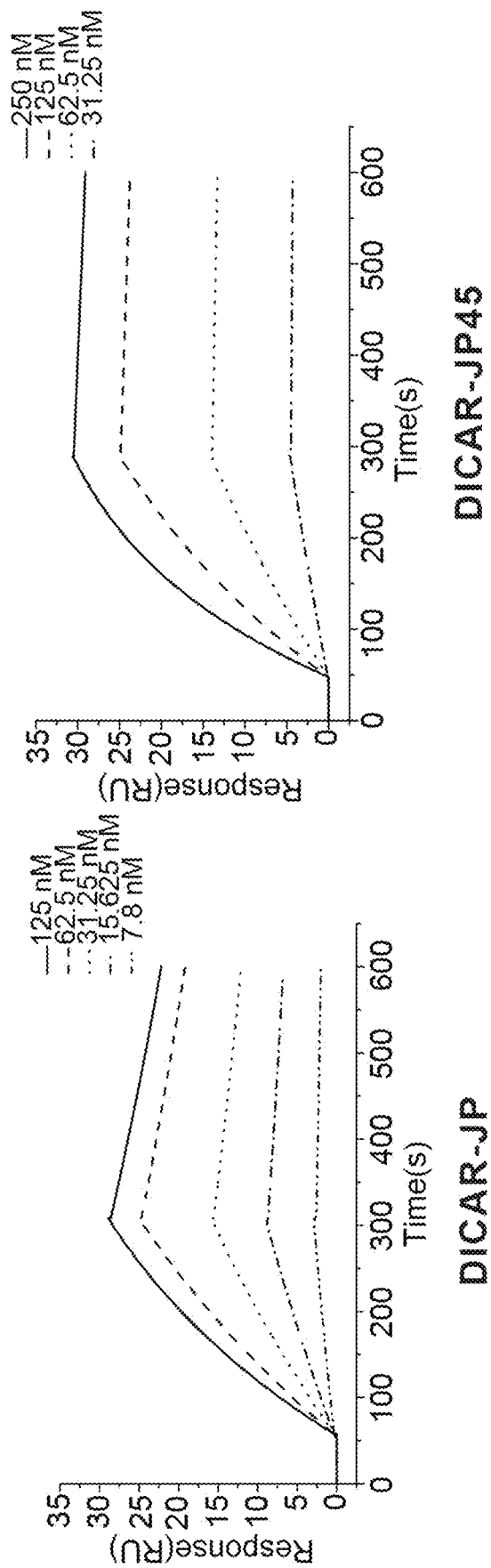
FIG. 8 shows affinity curves of DICAR-JP45 and DICAR-JP binding to NACα protein according to an example of the present disclosure.
Figure 9A:
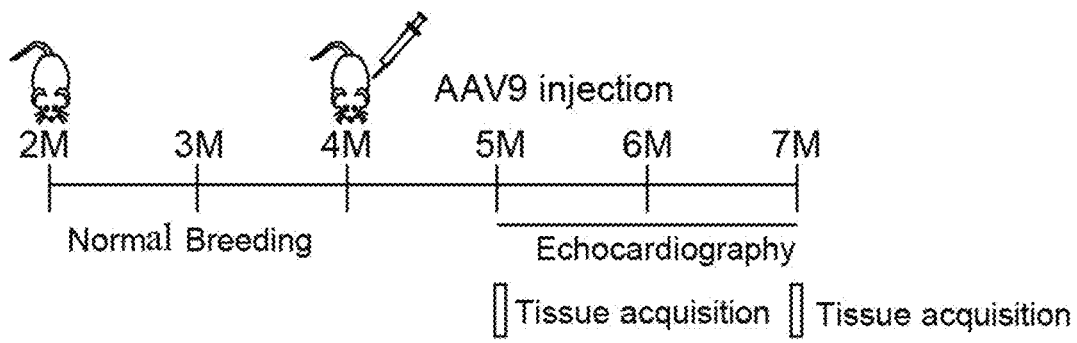
FIGS. 9A-9G show the results of Example 6 in the present disclosure, where
Figure 9B:
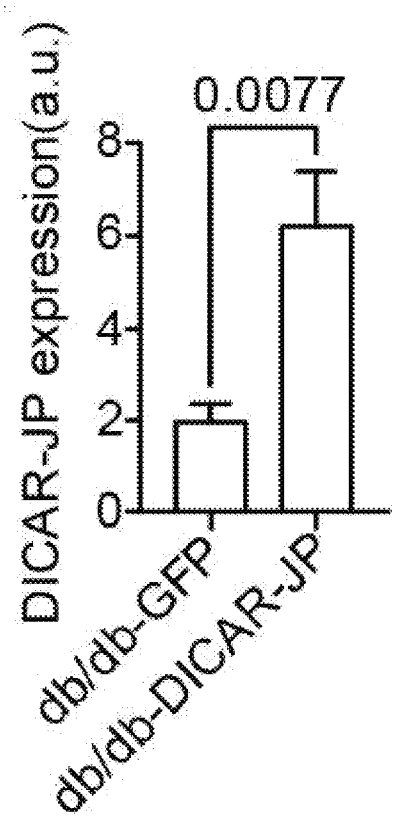
Figure 9C:
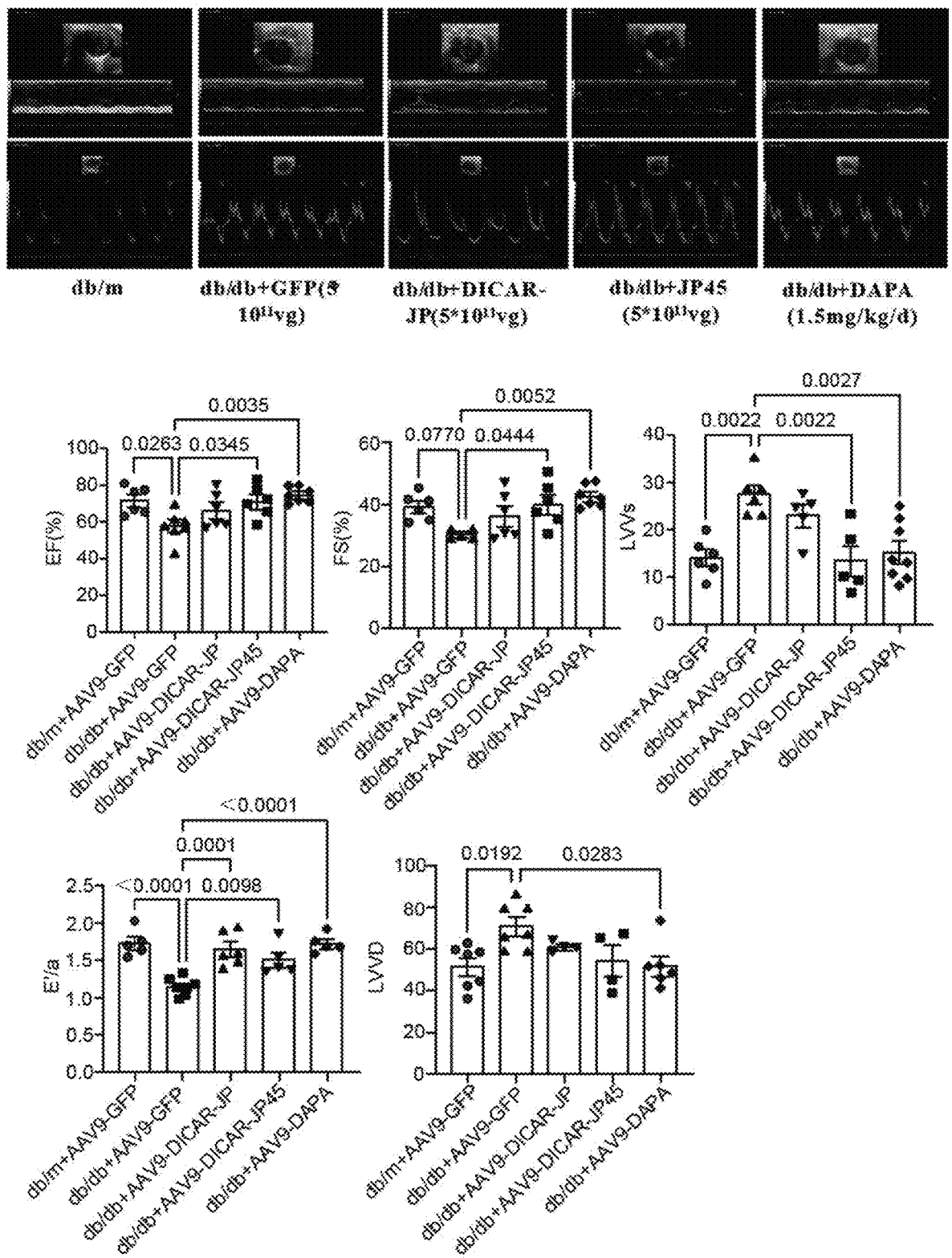
Figure 9D:
Figure 9E:
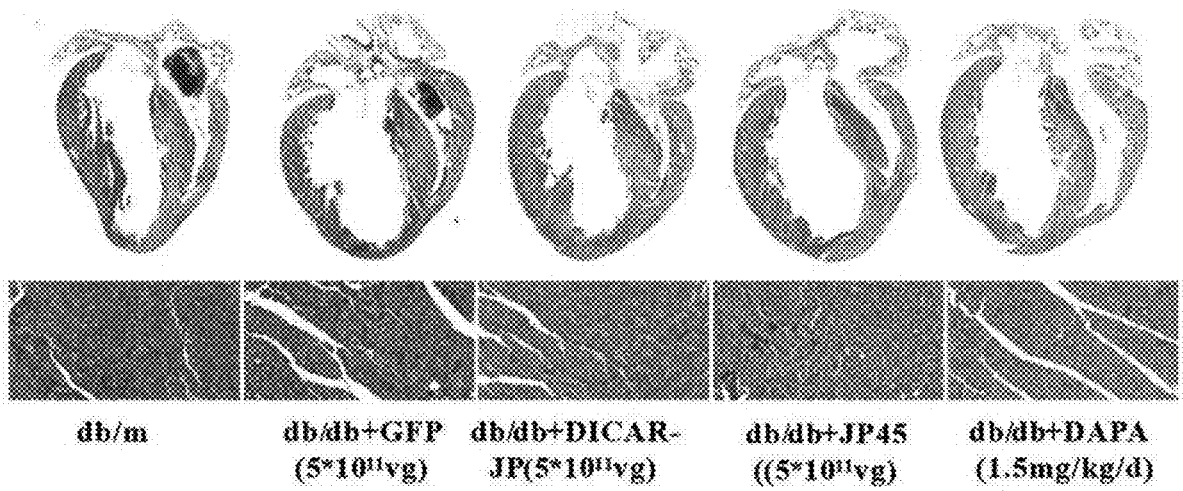
Figure 9F:
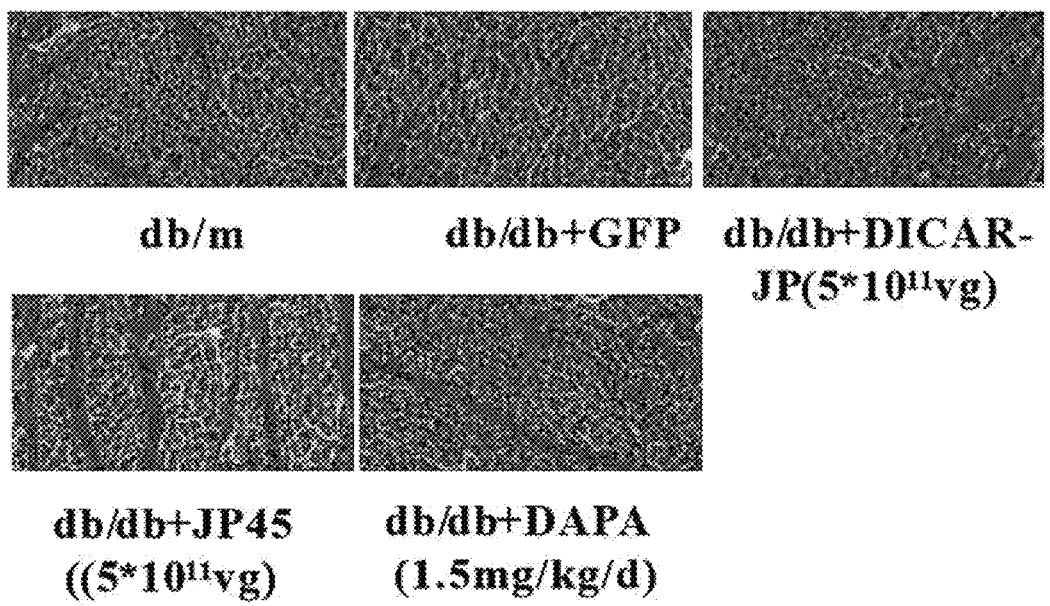
Figure 9G:
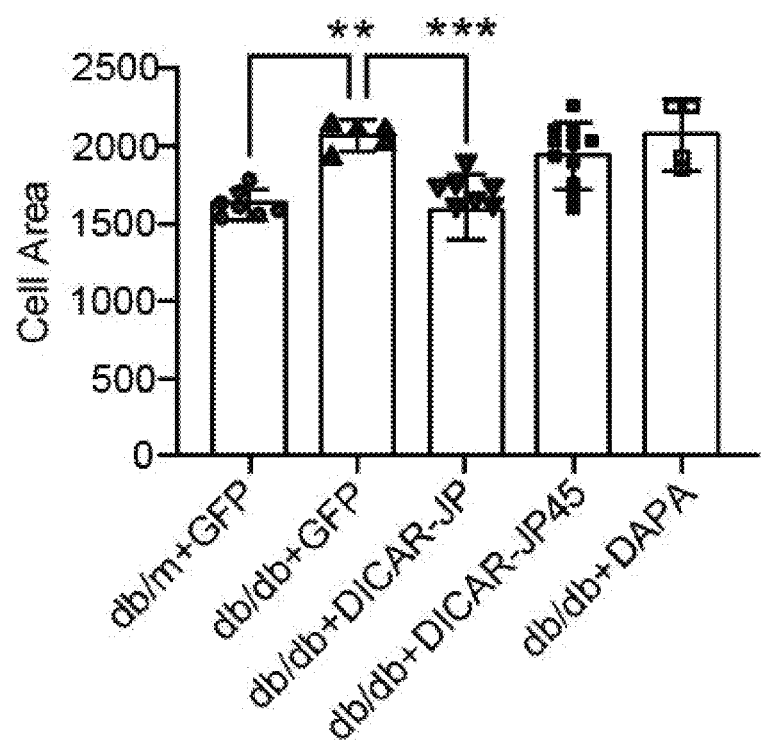

FIG. 8 shows the affinity curves of DICAR-JP45 and DICAR-JP binding to NACα protein. The affinity constants obtained by curve fitting and calculation are shown in Table 2. Among them, the dissociation coefficient $K_{off}$ is used to characterize the constant of the dissociation velocity of DICAR-JP45 and NACα protein, the binding coefficient $K_{on}$ is used to characterize the constant of the binding velocity of DICAR-JP45 and NACα protein, and the affinity constant $K_D$ is the ratio of $K_{off}/K_{on}$, indicating the equilibrium dissociation constant between DICAR-JP45 and NACα protein. The $K_D$ (M) of DICAR-JP45 and NACα protein is $6.09 \times 10^{-9}$; the $K_D$ (M) of DICAR-JP and NACα protein is $3.83 \times 10^{-8}$; it can be seen that DICAR-JP45 has stronger affinity and is more conducive to regulating downstream protein synthesis, folding, and other processes by binding to NACα protein, thereby exerting the potential of cardiomyocyte protection.

TABLE 2

Determination results of affinity-related parameters for DICAR-JP45 and DICAR-JP

| Small RNA | $K_{off}$ (1/s) | $K_{on}$ (1/Ms) | $K_D$ (M) |
|---|---|---|---|
| DICAR-JP45 | $1.52 \times 10^{-4}$ | $2.50 \times 10^4$ | $6.09 \times 10^{-9}$ |
| DICAR-JP | $8.66 \times 10^{-4}$ | $2.26 \times 10^4$ | $3.83 \times 10^{-8}$ |

It should be noted that the nucleotide sequence of the nonsense sequence (NC) used for negative control in the foregoing example of the present disclosure is as follows:

(see SEQ ID NO: 11)
UUGUACUACAAAAAGUACUG.

Example 6 Improvement of Cardiac Function of db/db Mice by AAV9-DICAR-JP and AAV9-DICAR-JP45

In the present disclosure, Shanghai Jikai Gene Medical Technology Co., Ltd. was commissioned to construct AAV9-DICAR-JP and AAV9-DICAR-JP45 viruses based on the sequences shown in SEQ ID NOS: 12 and 10, including CMV bGlobin EGFP-MCS-WPRE hGH polyA as a viral plasmid construction skeleton element sequence, a vector with the number GV412, and NheI and Hind III as cloning sites; the construction of microRNA up involves extending the precursor sequence of microRNA approximately 100 bp each upstream and downstream of the genome, ensuring the splicing efficiency of microRNA. The amplification primers for target fragment are shown in Table 3.

TABLE 3

Amplification primers for target fragment

| Primer name | Primer sequence (5'→3') | NO |
|---|---|---|
| JP(105989-1)-P1 | tggaaaggacgaaacaccgccaacc tccggggccacaatagcgagattt | SEQ ID NO. 13 |
| JP(105989-1)-P2 | ctattccgaagccgctgcagaaaaa aagcaccgactcggtgccactttt | SEQ ID NO. 14 |
| JP45(105990-1)-P1 | tggaaaggacgaaacaccgccaacc tccggggccacaatagcgagattt | SEQ ID NO. 15 |
| JP45(105990-1)-P2 | ctattccgaagccgctgcagaaaaa aagcaccgactcggtgccactttt | SEQ ID NO. 16 |

The mice were divided into db/m+AAV9-GFP (mock control, $5 \times 10^{11}$ vg), db/db+AAV9-GFP ($5 \times 10^{11}$ vg), db/db+AAV9-DICAR-JP ($5 \times 10^{11}$ vg), db/db+AAV9-DICAR-JP45 ($5 \times 10^{11}$ vg), and db/db+dapagliflozin (DAPA, 1.5 mg/kg/d) groups. AAV9 viruses were injected into the tail vein of the mice at the age of 4 months. The mice in the db/db group were administered by gastric gavage with DAPA at the age of 5 months, and the mice in the db/m group were controls without gastric gavage of DAPA. The changes of cardiac function were evaluated by small animal echocardiography at the age of 5, 6 and 7 months, respectively, cardiac remodeling was evaluated by Masson staining, and myocardial hypertrophy was evaluated by wheat germ agglutinin (WGA) staining.

FIGS. 9A-9G show varying degrees of improvement in mouse cardiac function 3 months after injection of AAV9-DICAR-JP and AAV9-DICAR-JP45 into the tail vein of the db/db mice at the age 4 months. The ejection fraction (EF) value of the db/db mice was 57.5%, while DICAR-JP45 improved the EF value to 71.07%. The E'/a value of the db/db mice was 1.14, DICAR-JP could improve the EF value to 1.73 (p<0.05), DICAR-JP45 could improve the EF value to 1.45, but there was no statistical significance. In addition, DICAR-JP45 could improve FS and LVVs values, and the effect was attributable to DAPA positive drugs. WGA results showed that DICAR-JP, but not DICAR-JP45, could effectively inhibit cardiomyocyte hypertrophy. Therefore, animal experiments showed that DICAR-JP45 had a certain effect on improving cardiac function in DCM but no significant effect on improving myocardial hypertrophy, while DICAR-JP could effectively improve myocardial hypertrophy. Both nucleic acid drug candidates may have different protective effects on the heart due to different sequences.

The above descriptions are merely preferred examples of the present application, and are not intended to limit the present application. Any modification, equivalent substitution and improvement without departing from the spirit and principle of the present disclosure should fall within the protection scope of the present disclosure.

What is claimed is:

1. A small RNA, having the nucleotide sequence of SEQ ID NO: 10.

2. A DNA molecule, wherein the DNA molecule encodes a small RNA having the nucleotide sequence of SEQ ID NO: 10.

3. A recombinant expression vector, comprising the DNA molecule according to claim 2.

4. An isolated cell, comprising the DNA molecule according to claim 2.

5. A medicament for prophylaxis and/or treatment of cardiomyopathy, wherein an active pharmaceutical ingredient (API) is one or more selected from the following i to iv:
   i. the small RNA according to claim 1;
   ii. a DNA molecule encoding the small RNA of i;
   iii. a recombinant expression vector comprising the DNA molecule of ii; and
   iv. a host cell comprising the recombinant expression vector of iii.

6. The medicament according to claim 5, wherein a dosage form of the medicament is a liquid formulation.

7. The medicament according to claim 6, wherein the medicament is for an intravenous injection.

8. The medicament according to claim 5, wherein the small RNA in the medicament has a concentration of 1-50 nM when the API is the small RNA.

9. The medicament according to claim 8, wherein the small RNA in the medicament has a concentration of 30-50 nM.

10. The medicament according to claim 5, wherein the cardiomyopathy is diabetic cardiomyopathy (DCM).

11. A method for inhibiting cardiomyocyte pyroptosis, comprising contacting with a cardiomyocyte a small RNA having the nucleotide sequence of SEQ ID NO: 10, a DNA molecule encoding the small RNA, a recombinant expression vector comprising the DNA molecule, a host cell comprising the recombinant expression vector, or the medicament according to claim 5.

12. A method for suppressing expression of apoptosis-associated speck-like protein containing a caspase recruitment domain (ASC) and/or gasdermin D (GSDMD), comprising contacting with a cardiomyocyte a small RNA having the nucleotide sequence of SEQ ID NO: 10, a DNA molecule encoding the small RNA, a recombinant expression vector comprising the DNA molecule, a host cell comprising the recombinant expression vector, or the medicament according to claim 5.

* * * * *